W. V. TURNER.
BRAKE VALVE DEVICE.
APPLICATION FILED NOV. 2, 1914.
1,219,605.
Patented Mar. 20, 1917.
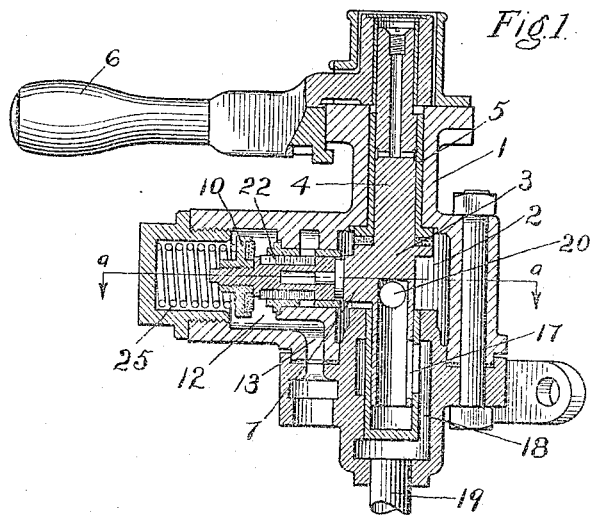
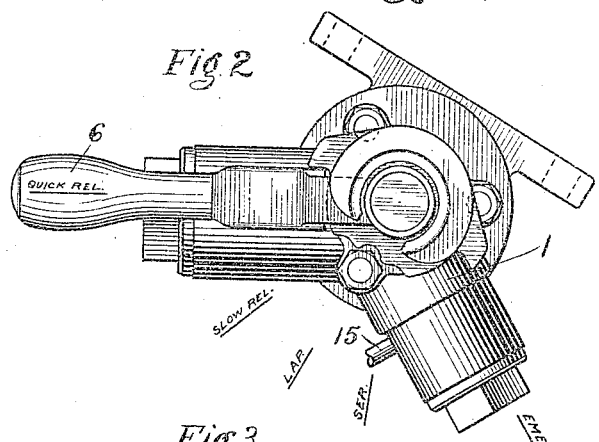
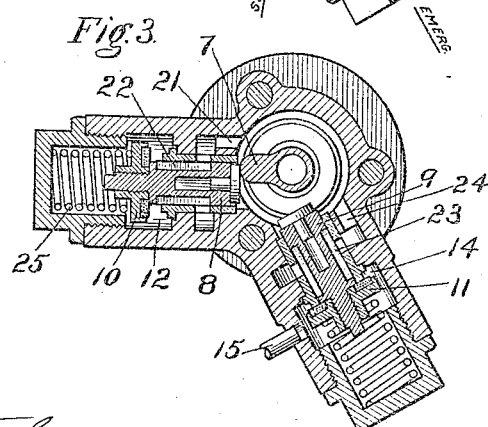
WITNESSES
INVENTOR
Walter V. Turner
by Wm. M. Cady
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-VALVE DEVICE.

1,219,605.

Specification of Letters Patent.

Patented Mar. 20, 1917.

Application filed November 2, 1914. Serial No. 869,802.

*To all whom it may concern:*

Be it known that I, WALTER V. TURNER, a citizen of the United States, residing at Edgewood, in the county of Allegheny and State of Pennsylvania, have invented new and useful Improvements in Brake-Valve Devices, of which the following is a specification.

This invention relates to fluid pressure brakes, and more particularly to a brake valve device.

The principal object of my invention is to provide an improved brake valve for the control of straight air brakes, in which the admission and release of fluid under pressure to and from the straight air pipe is controlled by puppet valves.

In the accompanying drawing, Figure 1 is a vertical section of a brake valve device embodying my improvements; Fig. 2 a plan view thereof; and Fig. 3 a horizontal section on the line a—a of Fig. 1.

According to my invention, the brake valve device may comprise a casing 1 having a chamber 2 containing a rotatable valve operating member 3. A stem 4 of the member 3 extends through bushing 5 and is provided with a keyed end of the usual operating handle 6.

On the member 3 and adapted to rotate in chamber 2 is a cam projection 7 for engaging the stems 8 and 9 of a release puppet valve 10 and an application or supply puppet valve 11 respectively.

The release valve 10 is contained in a chamber 12 open to exhaust port 13 and supply valve 11 is contained in chamber 14 open to pipe 15 which leads to a suitable source of fluid pressure supply, such as the main reservoir.

The member 3 is provided with a hollow downwardly projecting stem 16 having an opening 17 communicating with passage 18 leading to brake cylinder pipe 19 and a port 20 establishes communication from the interior chamber of the stem 16 to chamber 2.

The longitudinal axis of the release valve 10 is preferably offset with respect to the rotative axis of member 3 so that the movement of the cam 7 across the face of the stem 8 operates to vary the opening of the release valve and the axis of the supply valve 11 is arranged in a similar manner.

In full release position of the brake valve, as shown more particularly in Fig. 3 of the drawing, the cam 7 engages the stem 8 at the left hand edge and the release valve 10 is opened wide to permit the rapid exhaust of fluid from the brake cylinder through chamber 2, passage 21, cavity 22 in release valve stem 8, chamber 12, and exhaust passage 13.

If the brake valve handle is turned to slow release position the cam 7 moves across the face of the stem 8 to the right hand edge thereof, and this permits the valve 10 to move closer to its seat, so that the brake cylinder exhaust is correspondingly restricted and a slow release of the brakes is effected.

In order to make a straight air service application of the brakes, the brake valve handle is turned to service position, in which the cam 7 engages the left hand edge of the stem 9 of the application valve 11.

The supply valve is thus lifted slightly from its seat and fluid supplied from the source of pressure to chamber 14 flows through cavity 23 in stem 9 to passage 24 which opens into chamber 2, from which fluid flows through the ports 20, and 17 and passage 18 to the straight air pipe 19.

For effecting an emergency application, the brake valve handle is turned to emergency position, in which the cam 7 moves across the face of the stem 9 to the right hand edge and thereby moves the supply valve 11 farther from its seat so that an increased opening is provided for the flow of air from the source of pressure to the straight air pipe and the brake cylinder.

The brakes may be held applied by turning the brake valve handle to lap position, either from emergency or service application position, both the release and supply valves being closed in this position.

By means of the above described brake valve construction the brakes may be released slowly or rapidly as desired and may also be applied in service or emergency according to the extent to which the release and supply valves are opened by the movement of the operating cam.

It will be noted that the release valve 10 is subject to the pressure of a coil spring 25 tending to seat the valve on one side and that brake cylinder pressure on the opposite side tends to open the valve. Consequently, by adjusting the tension of the spring 25 to a desired degree, if for any reason the brake cylinder pressure should exceed the desired degree, due to leakage past the supply valve, for example, then the release valve will be automatically opened to relieve the excess pressure. It will thus be seen that the release valve operates as a safety valve for limiting the pressure in the brake cylinder as well as a release valve.

Having now described my invention, what I claim as new and desire to secure by Letters Patent, is:

In a brake valve for fluid pressure brakes, the combination with a manually operated rotatable member having a projection, of a puppet valve for controlling the release of the brakes, and a puppet valve for controlling the application of the brakes, each valve having an extended flat face, the movement across which from one edge to the opposite edge by said projection is adapted to open the valve, and the axis of rotation of the rotatable member being offset from a parallel plane through the axis of each valve.

In testimony whereof I have hereunto set my hand.

WALTER V. TURNER.

Witnesses:
A. M. CLEMENTS,
BARBARA HERBERT.

Copies of this patent may be obtained for five cents each, by addressing the "Commissioner of Patents, Washington, D. C."